Aug. 4, 1959         W. L. VERVEST ET AL         2,898,530
SHAFT POSITIONING MECHANISM
Filed July 8, 1955
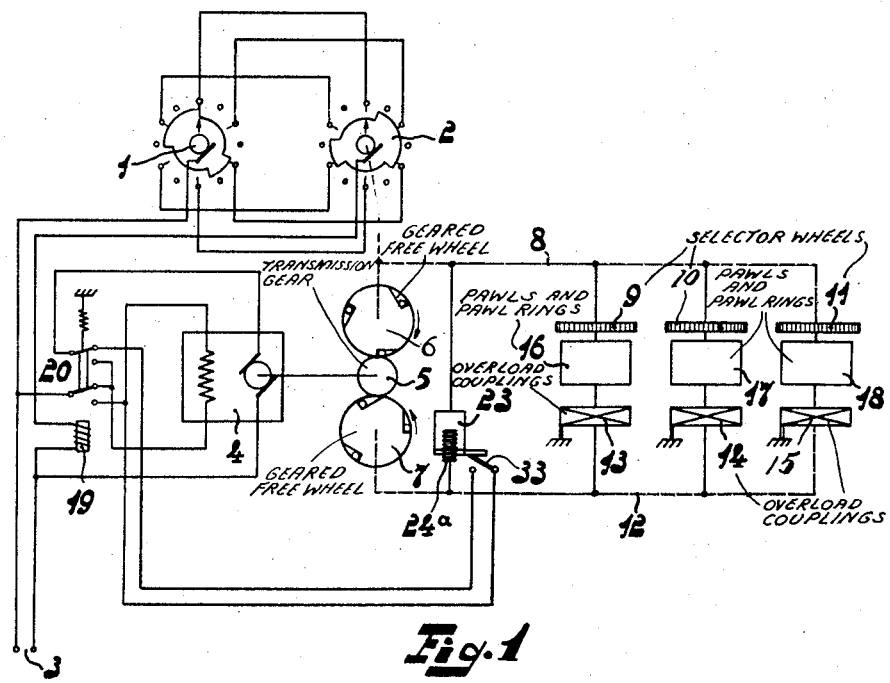
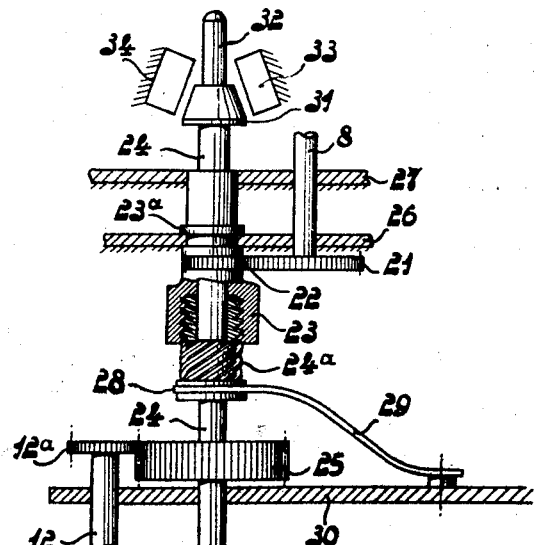
INVENTORS
WILHELMUS LAMBERTUS VERVEST
GOZEWIJN VAN GELDER
BY
AGENT

United States Patent Office 2,898,530
Patented Aug. 4, 1959

2,898,530

SHAFT POSITIONING MECHANISM

Wilhelmus Lambertus Vervest and Gozewijn Van Gelder, Hilversum, Netherlands, assignors, by mesne assignments, to North American Philips Company, Inc., New York, N.Y., a corporation of Delaware Application July 8, 1955, Serial No. 520,811

Claims priority, application Netherlands July 9, 1954

9 Claims. (Cl. 318—11)

This invention relates to shaft positioning mechanisms as described in an article by W. L. Vervest in "Communication News," vol. X, No. 1 of January 1949, pages 20 to 29. Such shaft positioning mechanisms comprise an electric motor with two senses of rotation, one or more shafts to be positioned which, through overload couplings, are connected to a shaft which is driven from the motor, selector members which are driven through another overload coupling from another shaft driven from the motor, click knobs and pawl rings determining the position of the shafts, an electro-magnetically operated relay determining the sense of rotation of the motor, a selector switch and a collector which is secured to the shaft driving the selector members and which is electrically connected to the selector switch. It is also known to provide such shaft positioning mechanisms with an arresting member which is also operated electro-magnetically and locks up the shaft, which drives the selection members, in a given position of these members. The overload couplings used are also known per se.

Again it is known to cause the motor to actuate two oppositely operating freewheel couplings such that the shaft driving the selector members is coupled with the electric motor through one freewheel coupling and the other freewheel coupling couples the input parts of the overload couplings with the electric motor. With these known shaft-positioning mechanisms it is necessary to provide all the overload coupling with switches connected in parallel in the motor supply circuit in order to permit the motor to be disconnected on reaching the desired position. Furthermore, the electromagnetic part of the relay should be heavy, because this part operates not only the switch constituted by the relay but also the arresting pawl and finally said relay has to occupy a fixed position in conjunction with operation of the arresting pawl. By the aforesaid requirements the construction becomes unduly large, more expensive and more complicated than is desirable.

The present invention has for its object to render the construction cheaper, simpler and less complicated and exhibits the feature that a shaft-positioning mechanism as described comprises a mechanism, which is provided between the shaft driving the input parts of the overload coupling and the shaft driving the selector members, said mechanism comprising two parts which are each driven by one of said shafts and are movable relatively to each other so as to open or close a switch. Primarily, the electro-magnetic relay now has only to reverse the sense of rotation of the motor, since the arresting pawl for the selector member shaft is superfluous therefore this relay is cheaper, lighter and moreover, can be located at will. Furthermore, switches operated by the overload coupling are dispensed with.

In one embodiment of the invention, the switch is connected in the motor supply circuit.

In one embodiment of the invention, the mechanism preferably comprises a spindle, which is provided with an external multiple screwthread, and a mating nut which, through an accelerating transmission, is driven from the shaft driving the selector wheels. This construction has the advantage of being simple and comprising a reduced number of moving parts. In a further embodiment of the invention, the spindle is driven, through a retarding transmission from the shaft driving the input parts of the couplings. The transmission to the nut is preferably so chosen that the nut, in the case of a maximum angular displacement of 360° of the selector wheels, divided by the number of pawls is removed from the spindle, the nut then being freely movable relatively to the spindle without the occurrence of axial displacement of the spindle. Consequently, if the number of pawls is 12, as is usual in such constructions, an angular displacement of 30° of the selector wheels is sufficient to screw the spindle entirely, free from the nut. Immediately the spindle comes off the nut, no further axial displacement of the spindle is possible.

In order to secure rapid engagement of the spindle into the nut, it is advantageous for the spindle, in another embodiment of the invention, to remain biased against the end of the nut after separation.

In a further embodiment of the invention the switch is preferably operated by the axial motion of the spindle.

A particular embodiment of the invention has the feature that upon rotation of the nut the spindle is carried along by the nut in an axial direction without involving rotation of the spindle. Rotation of the spindle is brought about by the transmission between the shaft driving the spindle and the latter, which transmission, in accordance with the pitch of the screwthread between nut and spindle is so chosen that the shaft performs an angular displacement of 400° before the spindle operates the switch, thus ensuring that the shafts to be positioned, which are also driven from the shaft driving the spindle, will have reached their positions prior to the switch fulfilling its function.

The spindle may co-act in many different ways with the switch. In one embodiment of the invention, the spindle preferably comprises an external conical part which extends co-axially with the spindle body and whose surface co-acts with a control member of the switch. This embodiment of the invention has the advantage that a comparatively considerable axial displacement of the spindle involves a small displacement of the control member of the switch, so that so-called micro-switches can be used.

A further embodiment of the invention may comprise a plurality of switches whose control members extend in the same plane which is at right angles to the centre line of the spindle, and whose contact points with the conical portion are equally spaced. In this manner the radial pressures exerted by the control members on the conical portion neutralize each other so that no resultant radial pressure is exerted on the spindle.

In a further embodiment of the invention, the conical portion of the spindle may comprise a central pin which operates a signalling device or itself comprises signalling means to show the position of the spindle relative to the nut.

In order that the invention may be readily carried into effect, it will now be described with reference to the accompanying drawing, shown by way of example, in which Fig. 1 diagrammatically shows a shaft-positioning mechanism, and Fig. 2 depicts the construction of the mechanism provided between the shaft, driving the selector members, and the shaft actuating the overload couplings.

In Fig. 1, the reference numeral 1 denotes a selector switch adapted to occupy twelve positions and electrically connected to a collector 2. A supply is connected at 3. A reversible motor 4 drives, through a transmission 5, two freewheel couplings 6 and 7. The freewheel coupling 6, which is adapted to rotate only in the direction indicated by the arrow, actuates a shaft 8 driving selector members 9, 10 and 11. Secured to the shaft 8 is also the collector 2, so that the latter rotates together with the freewheel coupling 6. The freewheel coupling 7 actuates, through a shaft 12, the input parts of overload couplings 13, 14, 15, the output parts of which are associated with members 16, 17 and 18 to be positioned. Furthermore, the construction comprises and electro-magnetic relay with a coil 19 and a switch 20. As shown in Fig. 2 the shaft 8 drives through a gear wheel 21 a gear ring 22 on a nut 23 which co-acts with a thread 24a of a spindle 24. This spindle 24 has a gear wheel 25 which is meshed with a gearwheel 12a fixed to and driven by the shaft 12. The nut 23 whose extension is supported in a frame plate 26 and in a second plate 27 furthermore exhibits a collar 23a to prevent axial displacement of the nut. The spindle 24 furthermore comprises a slot 28 engaged by a plate spring 29 whose other end is secured to a plate 30. The spindle 24 is also supported in said plate 30 and in the nut 23 and further comprises a conical portion 31 which terminates in a pin 32. Finally, there are two switches 33 and 34 shown diagrammatically, which switches surround the spindle 24 diametrically with respect to each other and whose control members rest against the outer surface of the conical portion 31.

This shaft-positioning mechanism operates as follows. The screw 24a is in its entirety in the nut 23 when the mechanism is not working. When the selector switch 1 is brought into a given position, the coil 19 becomes energized, so that the switch 20 is attracted. Hence the motor 4 is actuated and rotates in such a sense that the freewheel coupling 6 is carried along in the direction of the arrow, this freewheel coupling then entraining the collector 2 and the shaft 8 so that the selector wheels 9, 10 and 11 also rotate. Furthermore the nut 23 is carried along by the shaft 8 through an accelerating transmission 21, 22. This accelerating transmission, also in accordance with the pitch of screw thread 24a, is such that the spindle 24, which is axially movable relatively to the nut and steadily pressed against the nut by plate spring 29, is screwed with its thread 24a out of the nut 23 upon the selector wheels moving through an angle which is determined by the distance between two successive pawl levers. If consequently, as customary there are twelve pawls and pawl levers, the transmission is such that, after the selector wheels have moved through an angle of 30°, the spindle 24 is screwed in the nut. The screw spindle 24 is prevented from following the nut 23, since the gear wheel 25 is driven from the shaft 12 and rotation of this shaft is prevented by the freewheel coupling 7. Axial diaplacement of the spindle 24 involves axial displacement of the cone 31 which then moves the control member of the switch 33 so as to close the latter. The switch 33 is connected in the motor supply circuit in parallel with the switch 20 which also is still closed at this instance when the coil 19 is energized. However, when the coil 19 is not energized then the switch 33 and switch 20 are in series. Upon the selector wheels 9, 10 and 11 reaching the desired position, the collector 2 assumes a position in which the coil 19 does not pass current. The switch 20 resumes the position shown in the drawing and the direction of rotation of the motor is reversed, since now the motor is supplied through the closed switch 33. At this instant the shaft 8 is arrested by the freewheel coupling 6, so that the nut 23 is also prevented to rotate. Then the shaft 12 rotates, since the freewheel coupling 7 starts rotating in the direction of the arrow. The shaft 12 carries along the input parts of the overload couplings 13, 14, 15 and the output parts of these couplings actuate the members 16, 17, 18 to be positioned. Moreover, gear wheel 25 and consequently the screw spindle 24 is carried along so that the latter rotates and is screwed in the nut by its axial displacement. Axial displacement of the nut itself is not possible, since this is prevented by the collar 23a. The retarding transmission 12a to 25 between shaft 12 and spindle 24 is such that this spindle has to move through an angle of at least 400° before the spindle 24 is entirely screwed into the nut 23. Then it is ensured that the members 16, 17 and 18 to be positioned have assumed their correct positions and the overload couplings 13, 14, 15 have been disengaged. After maximum axial displacement of the spindle 24 relative to the nut 23, so that it is clear from the latter, the switch 33 is again opened, since the cone 31 again presses this switch and as the switch 33 is connected in the motor supply circuit, the motor is no longer supplied and stops, so that the complete construction is immobilized.

The whole shaft positioning mechanism consequently comprises only two switches, that is to say switch 20, which is actuated by coil 19, and switch 33 which is actuated by axial displacement of the spindle 24. It will be obvious that more switches 34 may be used, for example for signalling purposes. If switch 34 is used, all the switches will preferably be so positioned as to prevent resulting radial pressure on the spindle 24.

In contradistinction to conventional constructions the coil 19 actuates only the switch 20. This coil may consequently be made much lighter and, moreover, coil 19 and switch 20 may be provided in a random space of the construction, since their position is not fixed. The motor is usually supplied with alternating current.

The shaft 32 may be used to control a signalling device indicating, for example, that the nut 23 is free from the spindle 24. As an alternative, however, the end of the shaft 32 may be provided with a reference, for example, a red patch. The position of this reference is an indication of the position of the selector means and may consequently be used for the correct positioning of the mechanism and the setting of the desired positions of the members to be positioned.

Naturally, the overload couplings 13, 14, 15 may be provided in a known manner with switches, which are operated on clutching and declutching. Said switches may be used for signalisation purposes for connecting or disconnecting resistors, capacitors or similar component parts and for various other purposes. However these switches are not necessary for the operation of the shaft-positioning mechanism in itself.

What is claimed is:

1. A shaft positioning mechanism comprising a reversible electric motor, a selector shaft, a tuning shaft, a first coupling connecting said seclector shaft to said electric motor and rotatable in one direction, a second coupling connecting said tuning shaft to said electric motor and rotatable in another direction, at least one selector gear operatively connected to said selector shaft, an overload coupling connecting said tuning shaft with a shaft to be positioned, an electro-magentic relay controlling the direction of rotation of said motor, a selector switch, a collector switch secured to said selector shaft and electrically connected to said selector switch, a mechanism connected to the selector shaft at one end thereof and to the tuning shaft at the other end thereof, said mechanism having at least two parts and a switch connected to said motor, each of said parts being driven by one of said shafts and movable relatively to each other in order to operate said switch.

2. A shaft positioning mechanism as set forth in claim 1 wherein one of said parts is a spindle with an external multiple screw thread and the other part is a mating nut, and an accelerating transmission means coupling said mating nut with said selector shaft for actuating said nut.

3. A shaft positioning mechanism as set forth in claim 2 further comprising a retarding transmission driven by said tuning shaft, and means causing said retarding transmission in turn to drive said spindle.

4. A shaft positioning mechanism as set forth in claim 3 wherein said spindle is constantly pressed against the end of said nut after separation from said nut.

5. A shaft positioning meachanism as set forth in claim 3 wherein said switch is operated by the axial movement of said spindle.

6. A shaft positioning mechanism comprising a reversible electric motor, a selector shaft, a tuning shaft, a first coupling connecting said selector shaft to said electric motor and rotatable in one direction, a second coupling connecting said tuning shaft to said electric motor and rotatable in another direction, a plurality of selector gears operatively connected to said selector shaft, an overload coupling connecting said tuning shaft with said shafts to be positioned, an electro-magnetic relay controlling the direction of rotation of said motor, a selector switch, a collector switch secured to said selector shaft and electrically connected to said selector switch, a mechanism connected to the selector shaft at one end thereof and to the tuning shaft at the other end thereof, said mechanism having a threaded spindle and a mating nut, said nut upon rotation carrying along said spindle in an axial direction but in a non-rotatable manner, and a transmission between said tuning shaft and said spindle whereby said shaft performs an angular displacement of 400° before said spindle operates said switch.

7. A shaft positioning mechanism as set forth in claim 6 wherein said spindle is provided with an external conical portion which extends co-axially with said nut and which co-acts with said switch.

8. A shaft positioning mechanism as set forth in claim 7 further comprising a plurality of switches having operating parts which extend in the same plane and at substantially right angles to the center line of said spindle.

9. A shaft positioning mechanism comprising a reversible electric motor, a selector shaft, a tuning shaft, a first coupling connecting said selector shaft to said electric motor and rotatable in one direction, a second coupling connecting said tuning shaft to said electric motor and rotatable in another direction, a plurality of selector gears operatively connected to said selector shaft, an overload coupling connecting said tuning shaft with said shafts to be positioned, an electro-magnetic relay controlling the direction of rotation of said motor, a selector switch, a collector switch secured to said selector shaft and electrically connected to said selector switch, a mechanism connected to the selector shaft at one end thereof and to the tuning shaft at the other end thereof, said mechanism having a threaded spindle and a mating nut, said spindle being provided with an external conical portion which extends co-axially with said nut and which co-acts with said switch, a signalling device, said conical portion further being provided with a central pin which is adapted to operate said signalling device.

References Cited in the file of this patent

UNITED STATES PATENTS 2,617,313    Schweighofer et al. _____ Nov. 11, 1952